US007818451B2

(12) United States Patent
Bal

(10) Patent No.: US 7,818,451 B2
(45) Date of Patent: Oct. 19, 2010

(54) ROUTING SYSTEM

(75) Inventor: Balaji Bal, Zurich (CH)

(73) Assignee: Surfkitchen, Inc., Berkshire (GB)

( * ) Notice: Subject to any disclaimer, the term of this patent is extended or adjusted under 35 U.S.C. 154(b) by 1490 days.

(21) Appl. No.: 11/000,200

(22) Filed: Nov. 30, 2004

(65) Prior Publication Data
US 2005/0169240 A1 Aug. 4, 2005

(30) Foreign Application Priority Data
Feb. 2, 2004 (GB) ................................ 0402252.1

(51) Int. Cl.
G06F 15/173 (2006.01)
(52) U.S. Cl. ...................................... 709/238; 718/104
(58) Field of Classification Search ................. 709/217, 709/225, 238, 239; 718/104
See application file for complete search history.

(56) References Cited

U.S. PATENT DOCUMENTS

| 4,937,862 | A | | 6/1990 | Kosich ........................... 380/3 |
| 6,005,860 | A | * | 12/1999 | Anderson et al. ........... 370/352 |
| 6,119,165 | A | * | 9/2000 | Li et al. ....................... 709/229 |
| 6,668,284 | B1 | * | 12/2003 | Parkhurst ..................... 719/313 |
| 6,678,371 | B1 | * | 1/2004 | Flockhart et al. ........ 379/265.02 |
| 6,697,942 | B1 | * | 2/2004 | L'Heureux et al. .......... 713/152 |
| 7,035,202 | B2 | * | 4/2006 | Callon ......................... 370/216 |
| 7,051,367 | B1 | * | 5/2006 | Krishnaswamy et al. ...... 726/22 |
| 7,127,261 | B2 | * | 10/2006 | Van Erlach .............. 455/456.5 |
| 7,188,121 | B2 | * | 3/2007 | Tracey et al. ........... 707/103 R |
| 7,233,975 | B1 | * | 6/2007 | Gerraty et al. ............... 709/213 |
| 7,313,629 | B1 | * | 12/2007 | Nucci et al. ................. 709/241 |
| 7,336,973 | B2 | * | 2/2008 | Goldthwaite et al. ........ 455/558 |
| 7,376,953 | B2 | * | 5/2008 | Togasaki ..................... 718/105 |
| 7,426,573 | B2 | * | 9/2008 | Wells et al. ................. 709/238 |
| 7,505,759 | B1 | * | 3/2009 | Rahman ................... 455/412.2 |
| 2001/0052024 | A1 | * | 12/2001 | Devarakonda et al. ...... 709/238 |
| 2006/0168317 | A1 | * | 7/2006 | Charzinski et al. ......... 709/238 |

FOREIGN PATENT DOCUMENTS

| EP | 0694847 A3 | 8/1999 |
| WO | WO 93/10617 | 5/1993 |
| WO | WO 02/080470 A3 | 10/2002 |

* cited by examiner

*Primary Examiner*—Saleh Najjar
*Assistant Examiner*—Marie Georges Henry
(74) *Attorney, Agent, or Firm*—Oliff & Berridge, PLC

(57) ABSTRACT

A routing system for routing data and instructions between functional modules (22-38) in a mobile phone (5) is described. The system comprises a micro server (21) which includes a routing module (40), a standard routing table (42), a dynamic routing table (44) and a permission database (46). The routing module (40) is arranged to determine whether a signal received from any of the functional modules (22-38) includes command data corresponding to data stored within the standard routing table (42) or the dynamic routing table (44). If a signal is received which does not include command data the routing module (40) routes the signal on the basis of the identity of the functional module (22-38) from which the signal has been received. Otherwise, data stored in association with the identified command data within the standard routing table (42) or the dynamic routing table (44) is utilised to select a destination for a signal. The permission database (46) is utilised to restrict access to certain modules when an instruction is received from an external computer.

21 Claims, 5 Drawing Sheets

ROUTING SYSTEM

FIELD OF THE INVENTION

The present application concerns routing systems. In particular the present application concerns routing systems for routing data and instructions between functional modules in a mobile phone.

BACKGROUND OF THE INVENTION

Modern mobile cellular phones increasingly perform many functions in addition to enabling users to send and receive radio signals to make telephone calls. Thus for example in addition to being able to send voice signals many mobile phones are able to send and receive text messages. In some mobile phones a browser function is provided so that a user can use the phone to download web pages, ring tones or other data into the memory of the phone.

Many modern mobile phones are also provided with an infra red detector/emitter which enables the phone to communicate with other infra red enabled devices. A typical use for such a mobile phone would be to enable a portable computer to link to the internet via the mobile phone where the phone transmits and receives infra red signals from the portable computer and converts those signals into radio signals which are used to access the internet.

In a conventional computer architecture for a mobile phone a conversion unit is provided which is arranged to identify the different types of signal the phone can receive and to route different types of signals to appropriate functional modules for processing. Thus for example, when a phone receives a text message, the conversion unit initially recognises that a particular signal represents a text message. Once the conversion unit has determined that a received signal is representative of a text message, the message is then routed to the text message processing module for processing. Similarly when a signal representing an http message is received, it is routed to a browser module or in the case of a voice signal it is routed to the speaker of the telephone.

The existing computer architecture for routing signals within a module phone is however inflexible and a more flexible system would be desirable.

SUMMARY OF THE INVENTION

It is an object of the present invention there to provide a communications device comprising:
a receiver operable to receive communications signals;
a conversion unit operable to process signals received by said receiver;
one or more processing modules; and
a routing module for routing data between said one or processing modules and said conversion unit, wherein said conversion unit comprises a number of adaptors each of said adaptors being operable to process a different type of signal received by said receiver and to generate data corresponding to a received signal and pass said generated data to said routing module, and wherein said routing module comprises:
a data store configured to associate data identifying commands and sources of data with routing locations; and
a determination unit operable to receive data from said processing modules and said conversion unit and determine whether received data includes data identifying a command and to route said data to a routing location associated with said command by said data store if said data includes a command or to a routing location associated with the source of said data by said data store if received data is determined not include a data identifying command.

BRIEF DESCRIPTION OF THE DRAWINGS

Further aspects and embodiments of the present invention will become apparent with reference to the following description and accompanying drawings, in which.

DETAILED DESCRIPTION OF THE PREFERRED EMBODIMENTS

Overview of Communication System

Figure 1:
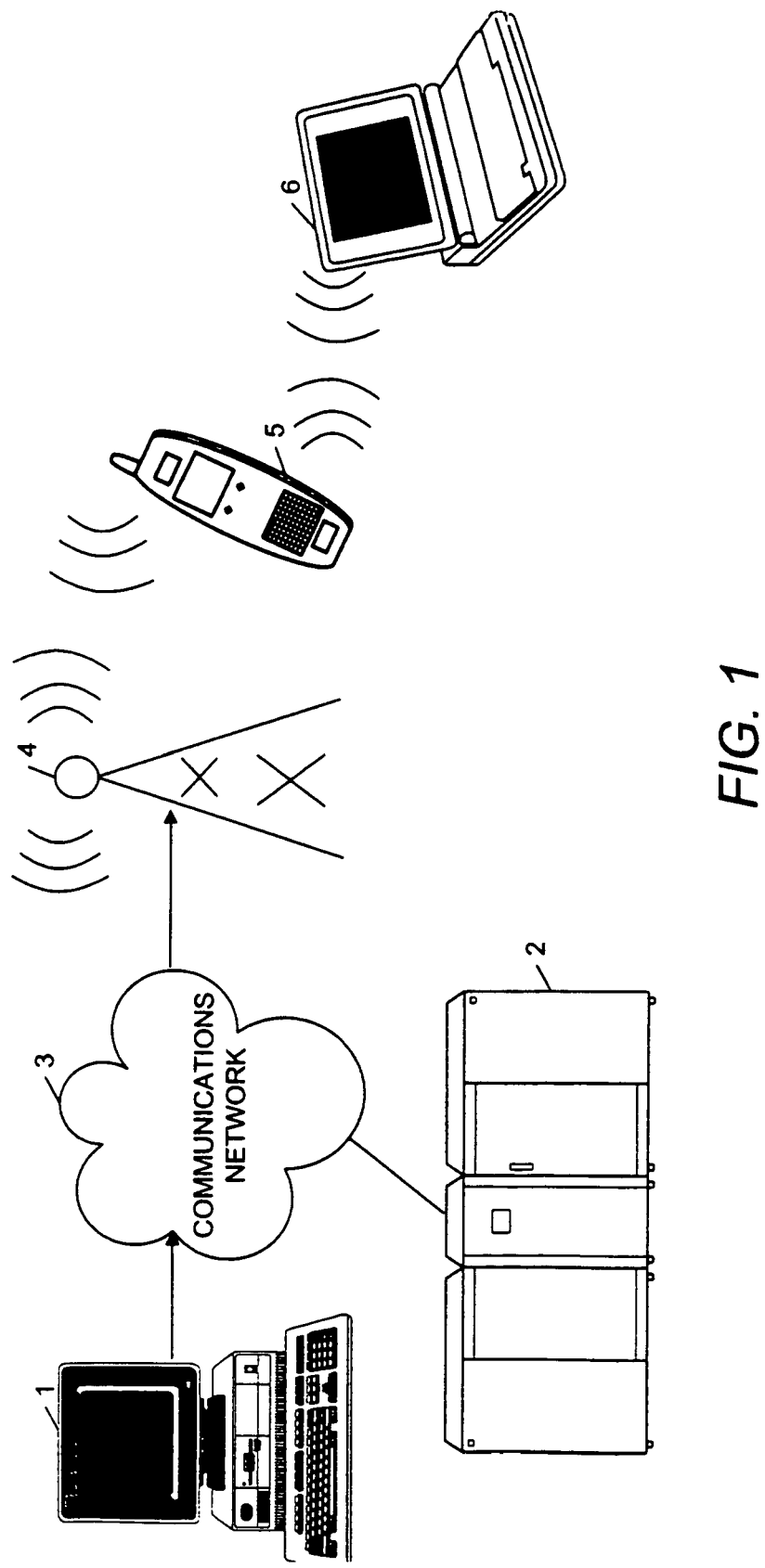
FIG. 1 is a schematic illustration of a communications system including a mobile phone embodying the present invention.

Referring to FIG. 1 which is an illustration of an exemplary communications system, a remote terminal 1 and a server 2 are shown connected via a communications network 3 and a radio link 4 to a mobile phone 5. A portable computer 6 is also illustrated arranged to communicate with the radio link 4 via the mobile phone 5.

The applicants have appreciated that although a conventional mobile phone 5 is able to communicate in a number of different ways, for example through the transmission of radio signals or alternatively through the transmission of infrared signals, the conventional computer architecture for a mobile phone 5 restricts the possible functionality of the mobile phone 5.

Thus, for example, although it is possible to store programs in the memory of a phone 5 which enables the phone 5 to generate appropriate radio signals for, for example, requesting data from a remote terminal 1 or a server 2 or alternatively for generating infra red signals for transmitting instructions to a television or other infrared activated device, it is not possible for a remote terminal 1 to activate the mobile phone 5 remotely to program a television or video.

Similarly, although a mobile phone 5 can act as a conduit for passing signals between a radio link 4 and a portable computer 6, the role of the mobile phone 5 in such an arrangement is limited to the conversion of radio signals into infrared signals and vice versa. In such conventional systems, it is not possible to utilise the processing power available on a modern mobile phone 5 to alter the signals during their passage.

The applicants have therefore devised a new computer architecture which improves the functionality of a mobile phone 5 as will now be described with reference to FIG. 2.

System Architecture

Figure 2:
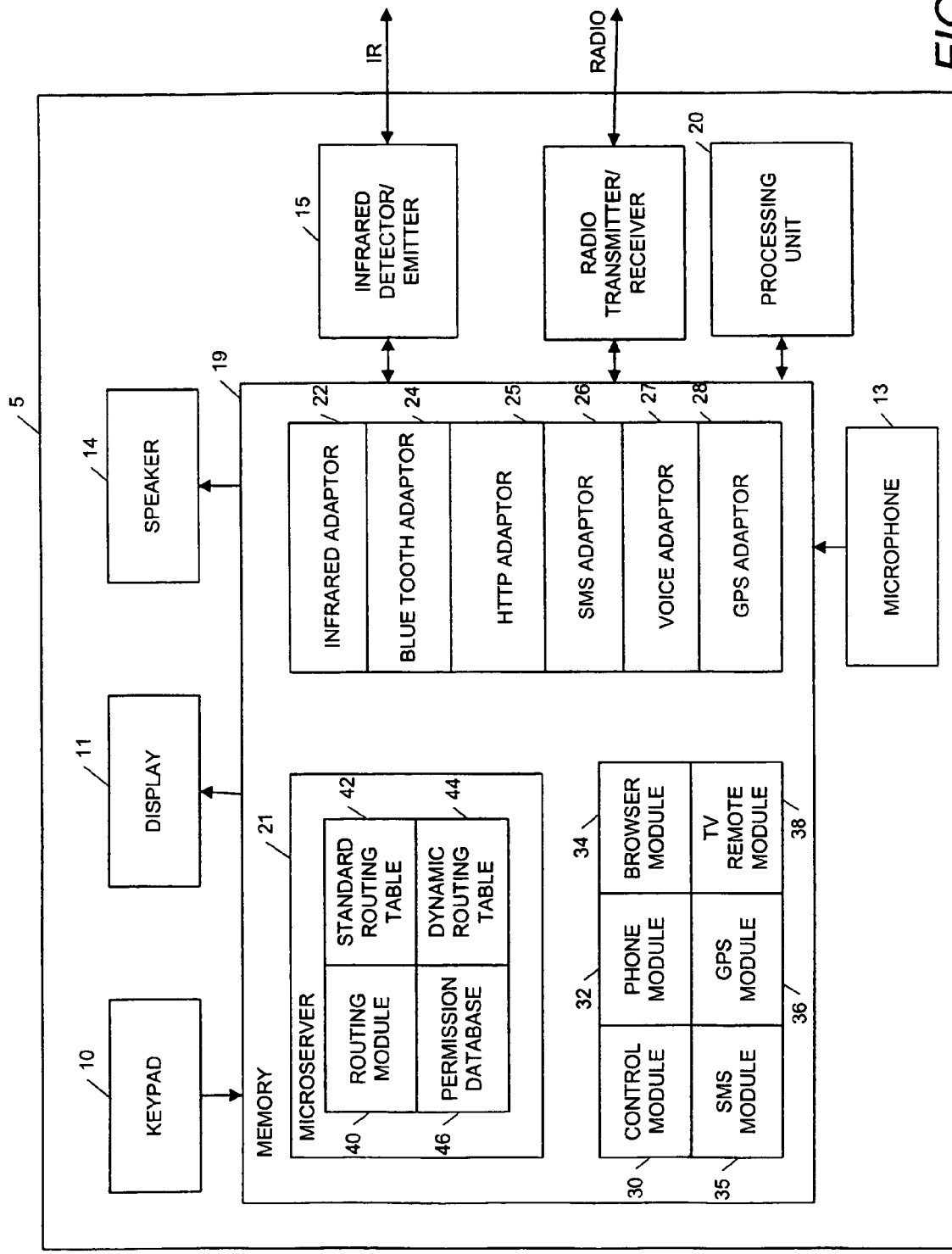
FIG. 2 is a schematic block diagram of the functional modules of the mobile phone of FIG. 1.

As shown in FIG. 2, in addition to a key pad 10 and a display screen 11, a mobile phone 5 comprises a microphone 13, a speaker 14, an infrared detector/emitter 15, a radio transmitter/receiver 17, a memory 19 and a processing unit 20.

The memory 19 is configured to store computer instructions for causing the processing unit 20 to process signals received from the keypad 10 and microphone 13, the infrared detector/emitter 15 and the radio transmitter/receiver 17 in a variety of different ways and to output signals to the display screen 11, the speaker 14, the infrared detector/emitter 15 and the radio transmitter/receiver 17.

In FIG. 2 the memory 19 is shown storing a series of functional modules. These modules comprise a micro-server module 21, a set of adaptor modules 22-28 for converting signals between a number of different formats and a set of processing modules 30-38 for controlling different functions of the phone 5. As will be described in greater detail, the micro-sever module 21 is arranged to co-ordinate the routing of signals between the other modules 22-38.

More specifically, the micro-server 21 is arranged to store data associating text strings identifying commands and data sources with routing destinations. When a signal is received by the micro-server 21 from any of the adaptor modules 22-28 or any of the processing modules 30-38, the micro-server 21 initially the micro-server 21 checks whether the received signal includes a text string corresponding command. If this is the case, the micro-server 21 routes the signal to the location associated with that command. Otherwise the micro-server 21 routes the signal on the basis of the identity of the module 22-38 from which the signal was received.

Providing a micro-server 21 and a set of adaptor modules 22-28 in this way increases the functionality of the mobile phone 5. This is because having a separate micro-server 21 separates the function of deciding where a signal is to be routed from the process of converting external signals into a format which can be understood by the functional modules 30-38 of the phone 5.

Together, the adaptors 22-28 enable all signals which need to be processed by the micro-server 21 to be in a common format. The micro-server 21 therefore does not need to distinguish between internally generated signals such as those received from the keypad 10 or microphone 13 or the processing modules 30-38 and the signals generated by the adaptor modules 22-28. Thus potentially any signal from any source can be utilised to access any of the stored processing modules 30-38.

In this embodiment, the adaptor modules comprise an infra red adaptor 22 for processing infra red signals, a blue tooth adaptor 24 for processing blue tooth signals, an HTTP adaptor 25 for processing HTTP signals, an SMS adaptor 26 for processing SMS signals, a voice adaptor 27 for processing voice signals and a GPS adaptor 28 for processing GPS signals. In addition to converting signals into a format for routing by the micro-server 21, the adaptors 22-28 are also arranged to receive signals from the micro-server 21 and to convert the signals into an appropriate format for activating the infra red detector/emitter 15 or the radio transmitter/receiver 17 respectively.

The processing modules 30-38, in this embodiment, comprise a control module 30 for enabling the phone to switch between different functions, a phone module 32 for controlling the phone when sending and receiving voice messages, a browser module 34 for controlling the operations of the phone 5 when accessing a server 2 or remote computer 1, an SMS module 35 for enabling the phone 5 to send and receive SMS messages, a GPS module 36 for processing GPS signals and a TV remote module 38 for enabling the phone to operate as a universal remote control.

In order to control the routing of signals, the micro-server 21, in this embodiment, comprises a routing module 40 and three lookup tables 42-46, being a standard routing table 42 storing data identifying the normal routing locations associated with different modules and commands, a dynamic routing table 44 for storing temporary routing instruction for specific actions being undertaken by the mobile phone 5 and a permission database 46 identifying which external computers 1,2,6 are permitted to instruct particular processing modules 32-38 stored within the memory 19.

Thus for example, the following would be examples of routing data stored in the standard routing table 42.

| Signals From | Route To |
| --- | --- |
| Keypad | Control Module |
| Microphone | Phone Module |
| Voice Adaptor | Phone Module |
| GPS Adaptor | GPS Module |

Additionally, the standard routing table 42 also stores data identifying a series of text strings associated with commands together with data identifying different processing modules or adaptors associated with processing those commands such as the following:

| Command | Route To |
| --- | --- |
| Transmit as HTTP | HTTP Adaptor |
| Activate TV Remote | TV Remote |
| Output Location | GPS Module |
| Activate Key Pad | — |

Finally, for some of the commands for which data is stored in the standard routing table 42, the permission database 46 stores data identifying the external computers from which such instructions may be received, such as:

| Command | Permitted |
| --- | --- |
| Activate TV Remote | Remote Terminal 1 |
| Output Location | Remote Terminal 1 |

Overview of Processing

An overview of the processing of signals by the mobile phone 5 of FIG. 2 will now be described with reference to FIGS. 3 A, 3B and 4.

Figure 3A:
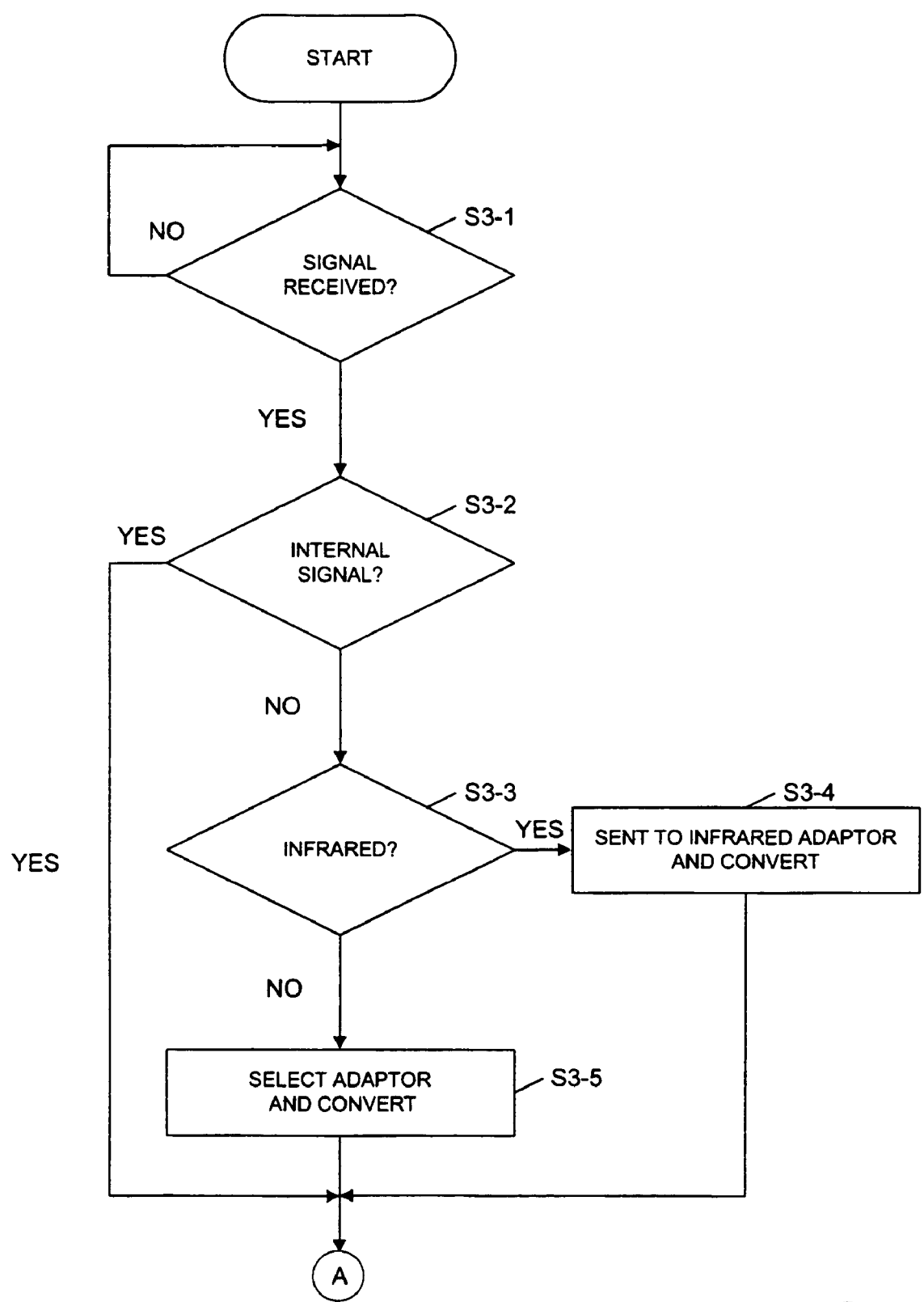
FIGS. 3 A & B are a flow diagram of the processing of signals by the mobile phone of FIG. 2.
Figure 3B:
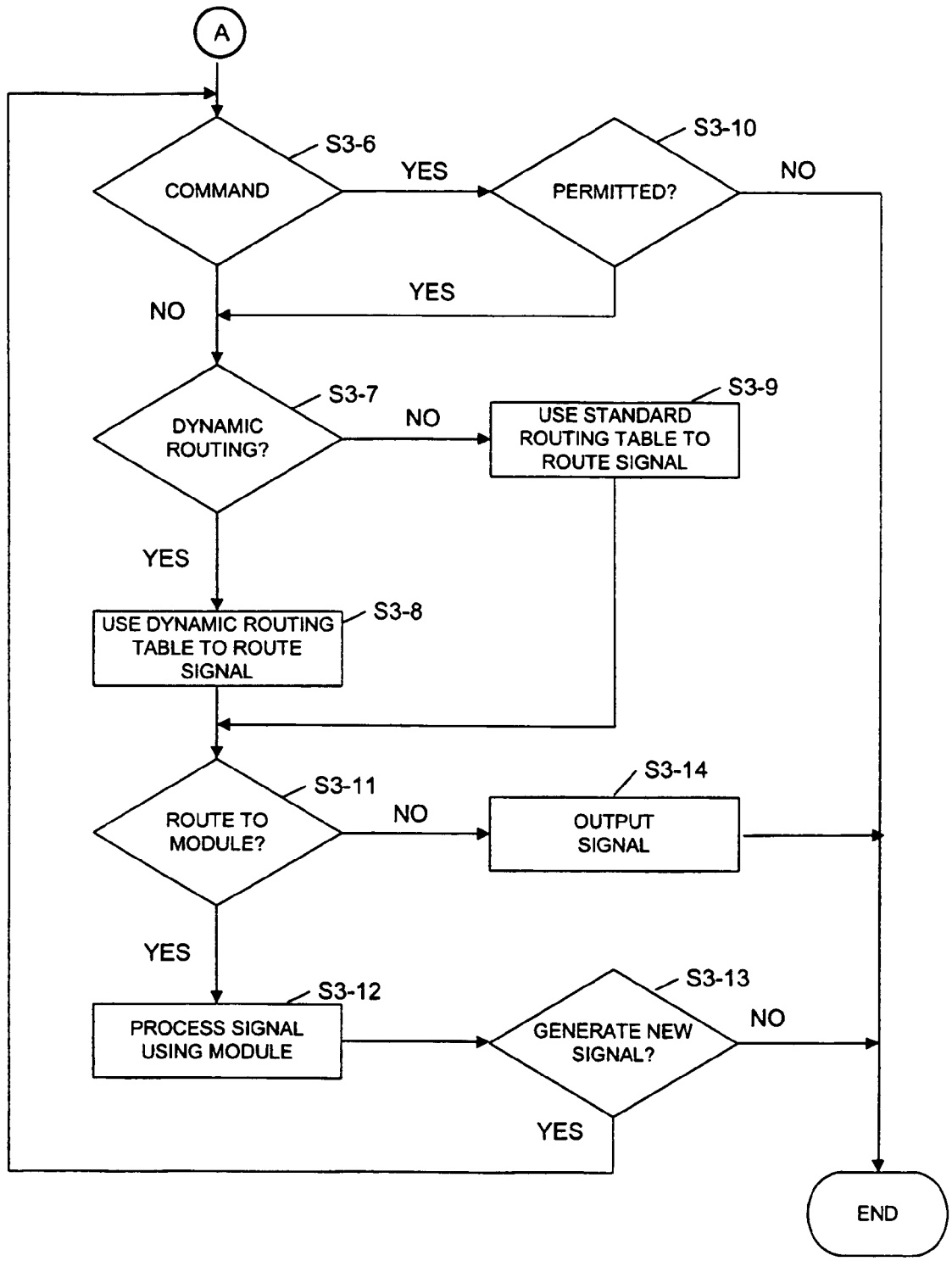

Turning to FIGS. 3A & B which together are a flow diagram of the processing of signals by the mobile phone 5 of FIG. 2, initially the phone 5 waits (S3-1) until a signal is received by either the infra red detector/emitter 15 or the radio transmitter/receiver 17 or from the keypad 10 or microphone 13. The phone 5 then determines (S3-2) whether the signal is an internal signal received from the keypad 10 or microphone 13 or an external signal received by the infra red detector/emitter 15 or the radio transmitter 17.

Where a signal is received either by the infra red detector/emitter or the radio transmitter/receiver 17 (S3-3), the signal is sent to an adaptor module 22-28 for conversion. In the case of a signal received by the infra red detector detector/emitter 15 the signal is immediately passed to the infra red adaptor 22 for conversion (s3-4). In the case of a radio signal received by the radio transmitter/receiver 17, the radio transmitter/receiver 17 selects (s3-5) an appropriate adaptor 24-28 for converting the received signal on the basis of the frequency of the received radio signal.

Once a signal received by the infra red detector/emitter 15 or the radio transmitter/receiver 17 has been passed to one of the adaptors 22-28, the selected adaptor then proceeds to convert the received signal into a native code signal which is suitable for processing by the micro-server 21.

In the case of a signal from the keypad 10 or microphone 13, these signals will automatically be in a form suitable for processing and are merely passed straight to the micro-server 21.

In this embodiment, the signals received by the micro-server 21 will each comprise a conventional signal or alternatively comprise a signal in a format which will be recognised by the micro-server 21 as representing a command.

Figure 4:
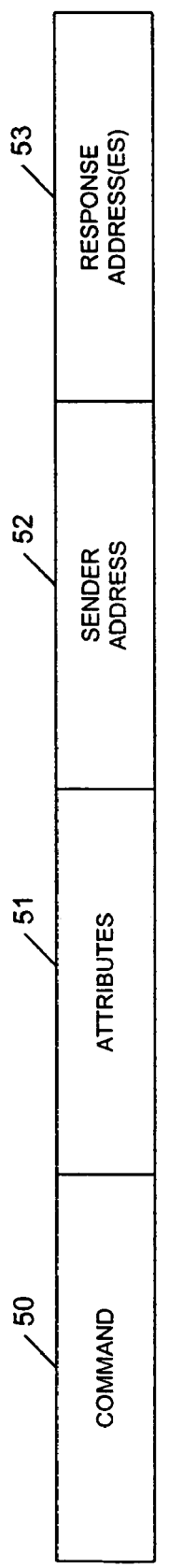
FIG. 4 is a schematic block diagram of a data structure of a signal to be processed by the mobile phone of FIG. 2.

FIG. 4 is a schematic block diagram of a data structure of a signal generated by the adaptors 22-28 for a command. In this embodiment, such a signal comprises a command data 50 being a text string identifying a command and optionally attribute data 51, a sender address 52 and one or more response addresses 53.

Thus for example, in the case of data received from the infra red detector/emitter 15 which is intended to be transmitted in the form of an HTTP message via a radio link 4, a command could be in the form of:
COMMAND DATA: TRANSMIT AS HTTP
ATTRIBUTE DATA: HTTP DATA TO BE DISPATCHED
SENDER ADDRESS DATA: ID FOR PORTABLE COMPUTER 6
RESPONSE ADDRESS DATA: NONE When a native code signal is received by the micro-server 21, the routing module 40 then proceeds to determine where the received signal should be routed.

More specifically, the routing module 40 initially checks (s3-6) the received signal to determine whether or not the received signal includes command data 50.

If this is not the case, the routing module 40 then checks (s3-7) the dynamic routing table 44 to see if any routing data relating to signals from the module from which the signal was received has been stored. If this is the case, the routing module dispatches (s3-8) the signal to the location identified by the dynamic routing table 44. Otherwise, the routing module 40 dispatches (s3-8) the signal to a location based upon the location associated with the origin of the signal by an entry in the standard routing table 42.

If the routing module 40 determines (s3-6) a received signal relates to a command, initially the routing module 40 checks (s3-10) that remote activation is permitted for that command. In this embodiment, this is achieved by the routing module 40 either determining that no entry associated with the command is stored in the permission database 46 or alternatively data corresponding to the sender address 52 received with the command is stored in association with data identifying the received command.

The routing module 40 then checks (s3-7) the dynamic routing table 44 to see if any routing data relating to the identified command included in the signal has been stored. If this is the case, the routing module dispatches (s3-8) the signal to the location identified by the dynamic routing table 44. Otherwise, the routing module 40 dispatches (s3-8) the signal to a location based upon the location associated with the identified command included in the signal by an entry in the standard routing table 42.

In this embodiment, once a signal including a command has been dispatched, the routing module 40 also updates the content of the dynamic routing table 42. This is achieved by the routing module 40 determining whether a command includes a response address 53. If this is the case the routing module 40 stores an entry in the dynamic routing table 44 link the module or adaptor to which data has just been dispatched to the identified response address.

Thus for example, when processing the following command received from the HTTP adaptor 26:
COMMAND: OUTPUT LOCATION
ATTRIBUTES: REMOTE TERMINAL ADDRESS
SENDER ADDRESS:REMOTE TERMINAL 1
RESPONSE ADDRESS:HTTP ADAPTOR the routing module 40 would initially check the permission database 46 to establish whether remote terminal 1 was permitted to use the command "Output Location". If this was found to be the case, the command "Output Location" together with attribute data identifying the remote terminal address would be dispatched to the location associated with that command either by an entry in the dynamic routing table 44 or if no entry for that command appeared in the dynamic routing table 44 the standard routing table 42. Finally the dynamic routing table 44 would be updated so that any responses sent by the module associated with the "Output Location" command would be routed to the HTTP adaptor 26.

If the routing module 40 determines (s3-11) that a received signal is to be processed by one of the processing modules 30-38, the identified module 30-38 is activated and the signal passed to the selected module and processed (S3-12).

If as a result of the processing the selected module 30-38 generates a signal (S3-13) this signal will also be of the same form as a signal generated by one of the adaptor modules 22-28. If such a signal is generated, the selected module sends the signal to the micro-server 21 where the received signal is processed in exactly the same way as if it had been received from one of the adaptors 22-28 (S3-6-S3-11).

When it is determined (S3-11) that a signal received by the micro-server 21 comprises a signal which does not require routing to one of the processing modules 32-38, the routing module 40 will instead determine that the signal needs to be output (s3-14) either to the screen 11 or speaker 14 or to one of the adaptor modules 22-28.

In the case a signal sent to the speaker 14 or display screen 11 the routed signal is then output as either sound through the speaker 14 or an image on the screen 11. In the case of a signal sent to one of the adaptors 22-28 the identified adaptor proceeds to process the received signal and converts it into the format associated with that adaptor. The converted signal is then passed to either the infra red detector/emitter 15 or the radio transmitter/receiver 17 which generates and outputs either an infra red signal or a radio signal corresponding to the converted signal in a conventional manner.

Illustrations of System in Use

A number of examples of the processing of signals by the micro-server 21 illustrating the flexibility of the described system architecture will now be described.

EXAMPLE 1

Use of Mobile Phone 5 as Remote Control

Initially, when the TV remote module 38 is activated, this causes the control module 30 to generate a signal of the following form:
COMMAND: ACTIVATE KEYPAD
ATTRIBUTES: NONE
SENDER ADDRESS: CONTROL MODULE
RESPONSE ADDRESS: TV REMOTE MODULE When this signal is received by the micro-server 21, this after checking in the permission database 46 that the control module 30 is permitted to use the "Activate Keypad" instruction, the micro-server 21 then proceeds to update the dynamic routing table 44 to store data in the dynamic routing table 44 linking the keypad 10 and the TV remote module 38 so that all responses received by the micro-server 21 from the keypad 10 are then routed to the TV remote module 38.

When the keys on the keypad 10 are depressed, signals representing the key presses are transmitted to the micro-server 21 from the keypad 10. When these signals are received, the micro-server 21 will identify the signals as being a response as the signals will not include any command data 50.

The micro-server 21 then proceeds to check the dynamic routing table 44 and routes the signal to the location associated with responses from the keypad 10 by the dynamic routing database 44. In the present case, where data identifying the TV remote module 38 is stored in the dynamic routing table 44 this will cause the signal to be routed from the keypad 10 via the micro-server 21 to the TV remote module 38.

In response to receiving these signals, the TV remote module 38 then generates a command of the following form:
COMMAND: TRANSMIT TO IR ADAPTOR
ATTRIBUTES: DATA REPRESENTING KEY PRESS
SENDER ADDRESS: TV REMOTE MODULE
RESPONSE ADDRESS: NONE In response to receiving such a signal from the TV remote module 38, as the signal includes command data 50, the micro-server 21 initially checks the permission database 46 to confirm that the TV remote module 38 is permitted to send data to the IR adaptor. The micro-server 21 then checks the dynamic routing table 42 and then the standard routing table 44 to identify which location is associated with the "Transmit to IR Adaptor" command. This will identify the infra red adaptor 22.

Finally, the micro-server 21 then routes the received attribute data to the infra red adaptor 22 which converts the received data into a signal for activating the infra red detector/emitter 15 and an infra red signal representing the key press is then output by the infra red detector/emitter 15. Where such a signal is detected by a remote controlled device such as a TV or video, the remote device will then respond to the received infra red signal in a conventional manner.

EXAMPLE 2

Transmission of Data Between a Portable Computer 6 and a Radio Link 4

When an http message is to be sent from a portable computer 6 to a remote terminal 1 or a server 2 via a mobile phone 5 and a radio link, initially, the portable computer 6 generates and infra red signal encoding a signal of the following form:
COMMAND: TRANSMIT AS HTTP
ATTRIBUTES: DATA REPRESENTING MESSAGE
SENDER ADDRESS: PORTABLE COMPUTER
RESPONSE ADDRESS: IR ADAPTOR When this signal is received by the infrared detector/emitter 15 it is converted into a digital signal and passed to the infra red adaptor 22 which then converts the digital signal into the format which can be understood by the micro-server 21.

The converted signal is then processed by the micro-server 21. Initially the routing module 40 checks the permission database 44 to see if the command "Transmit as HTTP" command is restricted. Assuming that this is not the case, the routing module 40 then accesses the dynamic routing table 44 and then the standard routing table 42 to identify the location to send data associated with a "Transmit as HTTP" command 50. This would then identify the HTTP adaptor 26.

Following this, the routing module 40 then sends the data representing the message to the HTTP adaptor 26 which converts the data into a format for transmission by the radio transmitter/receiver 17 and a radio signal corresponding to the converted data is then output to the radio link 4 via the radio transmitter/receiver 17.

The routing module 40 then causes the dynamic routing table 44 to be updated by storing data causing any responses subsequently received by the HTTP 26 adaptor to be routed to the IR adaptor 22.

When a response is generated by the remote terminal 1 or server 2 with which the portable computer 6 is communicating, this response will be in the form of a radio signal encoding a conventional http message. When the signal received by the radio transmitter/receiver 17 is converted into a digital signal and then converted into format which is understood by the micro-server 21 by the HTTP adaptor 26.

This converted signal is then passed to the micro-server 21. When this message is received, the micro-server 21 will identify the message as being a response as the message does not include any command data. The micro-server 21 therefore routes the response based upon the identification of the module from which the signal was received.

In this example, the routing module 40 would check the dynamic routing table 44 and establish that as the signal was received from the HTTP adaptor 25, it should be routed to the infra red adaptor 22. The data representing a received response is therefore sent to the infra red adaptor 22 which converts the data into an infra red signal which is then output by the infra red detector/emitter 15 to the portable computer 6.

EXAMPLE 3

Remote Activation of GPS Module

In this example it is assumed that a remote terminal 1 is utilised to try to obtain information about the current location of a mobile phone 5. Such a system might be of interest to a company which was attempting to track the locations of its vehicles.

In the case of such a system initially an instruction would be generated by the remote computer 1 and dispatched via the communications network 3 and radio link 4 to the mobile phone 5 whose location was to be identified.

When the instruction was received by the radio transmitter/receiver 17 of that mobile phone 5 it would be passed to the appropriate adaptor 22-28 which would proceed to convert the received instruction into the following form:
COMMAND: OUTPUT LOCATION
ATTRIBUTES: REMOTE TERMINAL ADDRESS
SENDER ADDRESS: REMOTE TERMINAL 1
RESPONSE ADDRESS: HTTP ADAPTOR When such an instruction was received by the micro-server 21, the routing module would initially check that remote terminal 1 was permitted to use the "Output Location" command by checking the permission database 46. When this had been confirmed, the instruction "Output Location" command and the attribute data would be sent to the GPS module 36 on the basis of an entry stored in the standard routing database 42 identifying that the command "Output Location" should be routed to the GPS module 36.

Finally, the routing module 40 would generate an entry in the dynamic routing table 44 to cause a generated response by the GPS module 36 to be routed back to the HTTP adaptor 25.

In response to receiving the 'Output Location' command, the GPS Module 36 would then output location data based upon the latest GPS signal output by the GPS adaptor 28 routed to the GPS module 28 by the micro-server 21 together with data identifying the remote terminal address. This response would then be sent to the micro-server 21 which would then proceed to route the response to the HTTP adaptor 25. When this response was received by the HTTP adaptor 25, the signal incorporating the position data and remote terminal address would be converted into a radio signal and sent to the terminal identified by the remote terminal address via the radio link 4 and the communications network 3.

EXAMPLE 4

Server Activation of SMS Module

In this example it is assumed that a user is utilising the browser module 34 of the mobile phone 5 to access a website stored on a server 2. In such circumstance, the dynamic routing table 44 would have stored the following entries to cause the signals from the keypad 10 and HTTP adaptor 25 to be sent to the browser module 34 for processing and to send the output of the browser module 34 to the http adaptor 25 for dispatch to the server 2.

| Signals From | Routed To |
| --- | --- |
| Keypad | Browser Module |
| Browser Module | HTTP adaptor - server 2 |
| HTTP adaptor - server 2 | Browser Module |

When accessing a particular link on a webpage for enabling a user to send feedback, the server 2 might, having identified that a user was browsing using a mobile phone 5, send the following instruction:

COMMAND: SEND SMS MESSAGE
ATTRIBUTES: TELEPHONE NUMBER
SENDER ADDRESS: SERVER 2
RESPONSE ADDRESS: NONE

When such an instruction was received by the micro-server 21 via the http adaptor 25, as the instruction is in the form of a command rather than merely a response from the server 2, when the signal is processed by the micro-server 21 rather than being routed to the browser module 34, the micro-server 21 would initially check the permission database 46 to determine whether use of the "Send SMS Message" was permitted by the server 2. If this was the case the command and attribute data would then be sent to the SMS module 35, being the module associated with the "Send SMS Message" command by data in the standard routing table 42.

When received by the SMS module 35, the instruction would then be processed which would initially store the received telephone number and then cause a command to be sent to the micro-server 21 in the following form to enable a user to enter a text message COMMAND: ACTIVATE KEYPAD
ATTRIBUTES: NONE
SENDER ADDRESS: SMS MODULE
RESPONSE ADDRESS: SMS MODULE As a result of the instruction, the routing module would cause the signals generated as a result of pressing the button on the keypad 10 to be sent to the SMS module 34 so that a user could enter a text message.

When the send button was the pressed, the SMS module 34 would then generate a command of the following form to cause in SMS message to be sent to the telephone number received from the server 2:

COMMAND: TRANSMIT AS SMS
ATTRIBUTES: TELEPHONE NUMBER & MESSAGE
SENDER ADDRESS: SMS MODULE
RESPONSE ADDRESS: NONE

Upon receiving this signal, the micro-server 21 would then route the telephone number and message to the SMS adaptor 26, being the routing destination associated with the "Transmit as SMS" command. This signal would then be processed by the SMS adaptor 26 before being send to the radio transmitter/receiver 17 so as to output a radio signal encoding the message for forwarding to the receiver identified by the telephone number.

In the above embodiment command data is described as being a text string identifying a command. It will be appreciated that the text string could be of a number of different forms. Thus for example a prefix of a text string could indicate that a string identified a command and the rest of the text string might indicate the specific command to be performed.

In such a system a string might be of the form: www.localhost\dialnumber\ where www.localhost\" was a prefix indicating that a string represents a command and "dialnumber\" indicates the specific instruction to be performed. When such an instruction was received, the prefix would be utilised by the routing module 40 to identify that a string constituted a command and the rest of the string would be used to select an appropriate module for executing the command.

In other embodiments, the fact a string was a command could be indicated in other ways, for example by sending type data indicting a type command rather than including a common prefix in the command strings.

In the above embodiment a permission database 46 is described which is utilised to determine which external computers are permitted to initiate certain actions within a mobile phone 5. It will be appreciated that rather than the data in a permission database 46 identifying individual computers the data could identify groups of computers permitted to access certain commands. Thus for example data might indicate that all computers having a network address starting with certain values are permitted to utilise a particular command.

More generally, it will be appreciated that instead of a simple database identifying commands and lists of computers permitted to utilise those commands, a permission database 46 could be provided which stored more complex rules for determining whether or not a particular computer is allowed to initiate certain instructions within a remote device.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier can be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A communications device comprising:
   a receiver operable to receive communications signals;
   a plurality of processing modules, including at least one processing module that processes a signal of a specific data format received by said receiver and generates data corresponding to a received signal in a format for use by the communications device; and
   a router that receives data from and routes data between said plurality of processing modules, wherein the router is responsive to receipt of data from a processing module to:
   determine whether data received from a processing module includes an item of command data associated with an intended destination for the received data; and
   if it is determined that data received from a processing module includes the item of command data associated with the intended destination for the received data, to route the received data to a selected processing module of the plurality of processing modules selected on the basis of the destination associated with the item of command data included in said received data; and
   if it is determined that data received from a processing module does not include the item of command data associated with the intended destination for the received data, to route the received data to a selected processing module of the plurality of processing modules other than the processing module from which the received data was received, selected on the basis of the identity of the processing module from which the received data was received.

2. The communications device in accordance with claim 1 wherein said router comprises:
   a data store configured to store data associating processing modules with stored items of command data; and
   a determination unit operable to receive data and determine whether received data includes data corresponding to a stored item of command data identified by data stored in said data store and to route said received data to the processing module associated with said stored item of command data by data stored in said data store.

3. The communications device in accordance with claim 2 wherein said data store is configured to store data associating each of said processing modules with another of said processing modules, wherein said determination unit is operable to route received data determined not to include the item of command data to the processing module associated by data stored in said data store with the processing module from which said data was received.

4. The communications device in accordance with claim 1, wherein said router is operable to store data associating stored items of command data with one or more sender identifiers, wherein said router is operable to determine whether received data includes both command data and a sender identifier and prevent the routing of received data including the item of command data if said received data does not also include a sender identifier associated with said item of command data.

5. The communications device in accordance with claim 4, wherein said router is operable to route received data including the item of command data if said included item of command data is not associated with any sender identifiers.

6. The communications device in accordance with claim 1 further comprising:
   one or more input devices, wherein said router is operable to store data associating each of said input devices with a processing module, wherein said router is operable to route data received from said input devices to the processing module associated with said input device by stored data.

7. The communications device in accordance with claim 6 wherein said one or more input devices comprise input devices selected from a group comprising a keyboard and a microphone.

8. The communications device in accordance with claim 1 further comprising:
   one or more output devices, wherein said router is operable to store data associating said output devices with one or more of said processing modules, wherein said router is operable to route data determined not to include command data received from said identified processing modules to the output device associated by said stored data with the processing module from which said data has been received.

9. The communications device in accordance with claim 8 wherein said one or more output devices comprise output devices selected from a group comprising a speaker and a display screen.

10. The communications device in accordance with claim 1 further comprising:
    a temporary routing store operable to store routing data identifying a destination for received data which does not include the item of command data received from identified sources of data, wherein said router is operable to route data which does not include the item of command data received from a source identified as a source of data by routing data stored in said temporary routing store to the destination identified as a destination for data from said source of data by said routing data in said temporary routing store.

11. The communications device in accordance with claim 10, wherein said router is operable to determine if received data which includes command data also includes data identifying a response address and responsive to determining that received data includes command data and a response address to store data in said temporary routing store identifying the destination to which said received data is routed as a source of data and said response address as a destination for data received from said source of data.

12. The communication device in accordance with claim 1 wherein said plurality of processing modules comprise processing modules selected from the group of processing modules comprising:
    an infrared adaptor, a Bluetooth adaptor, an http adaptor, an SMS adaptor, a voice adaptor and a GPS adaptor.

13. The communications device in accordance with claim 1 wherein said communications device comprises a mobile cellular phone.

14. The method of routing data within a communications device comprising:
    receiving data from a processing module of a plurality of processing modules;
    responding to receipt of data from a processing module by determining whether the received data includes an item of command data associated with an intended destination for the received data; and
    if it is determined that data received from a processing module includes the item of command data associated with the intended destination for the received data, routing the received data to a selected processing module of the plurality of processing modules selected on the basis of the destination associated with the item of command data included in said received data; and if it is determined that the data received from a processing module does not include the item of command data associated with the intended destination for the received data, routing the received data to a selected processing module of the plurality of processing modules other than the processing module from which the received data was received, selected on the basis of the identity of the processing module from which the received data was received.

15. The method in accordance with claim 14 further comprising:

storing data associating items of command data with one or more sender identifiers;

determining whether received data includes both the item of command data and a sender identifier; and preventing the routing of data if received data including the item of command data does not include a sender identifier associated with said item of command data.

16. The method in accordance with claim 15 further comprising:

routing received data including the item of command data if said item of command data is not associated with any sender identifiers.

17. The method in accordance with claim 14 further comprising:

determining whether received data including the item of command data includes a response address;

dispatching received data to a destination on the basis of said included command data; and if received data including the item of command data also includes a response address, routing subsequent data not including command data received from the destination to which said received data including a response address is dispatched to a destination on the basis of said included response address.

18. The method in accordance with claim 14 wherein said communications device comprises a mobile cellular phone.

19. The computer readable storage medium storing computer implementable instructions for causing a programmable computer to become configured as a communications device in accordance with claim 1.

20. The computer readable storage medium in accordance with claim 19 comprising a SIM card.

21. The computer readable storage medium in accordance with claim 19 comprising a communications signal within a communications network.

* * * * *